United States Patent
Mankovskii et al.

(10) Patent No.: US 10,630,463 B2
(45) Date of Patent: Apr. 21, 2020

(54) META BLOCK CHAIN

(71) Applicant: CA, Inc., Islandia, NY (US)

(72) Inventors: Serge Mankovskii, Morgan Hill, CA (US); Steve Versteeg, Victoria (AU)

(73) Assignee: CA, Inc., Islandia, NY (US)

( * ) Notice: Subject to any disclaimer, the term of this patent is extended or adjusted under 35 U.S.C. 154(b) by 293 days.

(21) Appl. No.: 15/905,808

(22) Filed: Feb. 26, 2018

(65) Prior Publication Data

US 2019/0268138 A1 Aug. 29, 2019

(51) Int. Cl.
*H04L 9/06* (2006.01)
*G06F 21/60* (2013.01)
*H04L 9/32* (2006.01)
*H04L 9/14* (2006.01)
*G06Q 20/06* (2012.01)
(Continued)

(52) U.S. Cl.
CPC ............ *H04L 9/0637* (2013.01); *G06F 3/064* (2013.01); *G06F 16/2228* (2019.01); *G06F 21/602* (2013.01); *G06Q 20/06* (2013.01); *H04L 9/14* (2013.01); *H04L 9/3236* (2013.01); *G06Q 2220/00* (2013.01)

(58) Field of Classification Search
CPC ....... H04L 9/0637; H04L 9/3236; H04L 9/14; H04L 2209/56; H04L 2209/38; G06F 16/2228; G06F 21/602; G06F 21/64; G06F 3/064; G06Q 20/06; G06Q 2220/00
See application file for complete search history.

(56) References Cited

U.S. PATENT DOCUMENTS

| | | | |
|---|---|---|---|
| 2016/0028552 A1* | 1/2016 | Spanos ................ | H04L 9/3297 713/178 |
| 2016/0259937 A1* | 9/2016 | Ford ..................... | G06F 21/554 |
| 2017/0075941 A1* | 3/2017 | Finlow-Bates ....... | H04L 67/104 |

(Continued)

FOREIGN PATENT DOCUMENTS

WO WO-2018229531 A1 * 12/2018 ........... H04L 9/3247

OTHER PUBLICATIONS

"Natoli et al., The Balance Attack or Why Forkable Blockchains Are Ill-Suited for Consortium, Jun. 2017, IEEE, pp. 1-12" (Year: 2017).*

(Continued)

*Primary Examiner* — Saleh Najjar
*Assistant Examiner* — Nhan Huu Nguyen
(74) *Attorney, Agent, or Firm* — Morgan, Lewis & Bockius LLP

(57) ABSTRACT

A fork in a block chain data structure is identified, the block chain data structure including a first set of blocks each describing a respective transaction. The fork includes a first branch beginning with a first block and a second branch beginning with a different second block. The first branch includes a first set of blocks comprising at least the first block, and the second branch includes a second set of blocks including at least the second block. A determination is made, based on a consensus protocol, that the second branch is to be discarded. Accordingly, a meta block is generated to identify and describe the second branch. The meta block is to be included in a meta block chain data structure. The meta block chain data structure is separate from the block chain data structure and comprises meta blocks to record orphan branches of the block chain data structure.

20 Claims, 10 Drawing Sheets

(51) Int. Cl.
*G06F 16/22* (2019.01)
*G06F 3/06* (2006.01)

(56) References Cited

U.S. PATENT DOCUMENTS

| | | | |
|---|---|---|---|
| 2017/0262862 A1* | 9/2017 | Aljawhari | G06F 16/242 |
| 2017/0337534 A1* | 11/2017 | Goeringer | H04L 9/3239 |
| 2017/0352219 A1* | 12/2017 | Spanos | G07C 13/00 |
| 2017/0359374 A1* | 12/2017 | Smith | G06F 21/57 |
| 2018/0039667 A1* | 2/2018 | Pierce | G06Q 40/04 |
| 2018/0088928 A1* | 3/2018 | Smith | H04L 67/34 |
| 2018/0102013 A1* | 4/2018 | Spanos | G06F 21/64 |
| 2018/0114218 A1* | 4/2018 | Konik | G06Q 20/382 |
| 2018/0117446 A1* | 5/2018 | Tran | A63B 71/085 |
| 2018/0176229 A1* | 6/2018 | Bathen | G06F 8/65 |
| 2018/0204191 A1* | 7/2018 | Wilson | G06Q 20/3829 |
| 2018/0323963 A1* | 11/2018 | Stollman | H04L 9/3239 |
| 2019/0043024 A1* | 2/2019 | Lancashire | G06Q 20/223 |
| 2019/0079998 A1* | 3/2019 | Rush | G06F 16/335 |
| 2019/0147065 A1* | 5/2019 | Maeda | H04L 9/0637 380/37 |
| 2019/0160660 A1* | 5/2019 | Husain | B25J 9/163 |
| 2019/0182284 A1* | 6/2019 | Signorini | G06F 21/55 |
| 2019/0190719 A1* | 6/2019 | van de Ruit | G06F 21/64 |
| 2019/0205563 A1* | 7/2019 | Gonzales, Jr. | G06F 16/1805 |
| 2019/0236298 A1* | 8/2019 | Agarwal | H04L 9/3247 |
| 2019/0236598 A1* | 8/2019 | Padmanabhan | G06Q 20/0655 |
| 2019/0244306 A1* | 8/2019 | Kursun | H04L 9/3239 |
| 2019/0296915 A1* | 9/2019 | Lancashire | G06Q 20/223 |
| 2019/0386970 A1* | 12/2019 | Signorini | H04L 9/3218 |

OTHER PUBLICATIONS

"Tosh et al., Consensus Protocols for Blockchain-based Data Provenance: Challenges and Opportunities, Oct. 2017, IEEE, pp. 1-6" (Year: 2017).*

"Chen et al., Extending Blockchain Functionality with Statechain, Dec. 2017, IEEE, pp. 1-8" (Year: 2017).*

"Sato et al., Long-term public blockchain: Resilience against Compromise of Underlying Cryptography, Aug. 2017, IEEE, pp. 1-8" (Year: 2017).*

"Anceaume et al., Safety Analysis of Bitcoin Improvement Proposals, Nov. 2016, IEEE, pp. 1-8" (Year: 2016).*

"Kovalchuk et al., Analysis of Splitting Attacks on Bitcoin and GHOST Consensus Protocols, Sep. 2017, IEEE, pp. 1-5" (Year: 2017).*

"Decker et al., Information Propagation in the Bitcoin Network, Sep. 2013, IEEE, pp. 1-10" (Year: 2013).*

"Tonnescu et al., Catena: Efficient Non-equivocation via Bitcoin, May 2017, IEEE, pp. 1-17" (Year: 2017).*

"Pirlea et al., Mechanising Blockchain Consensus, Jan. 2018, ACM, pp. 1-13" (Year: 2018).*

"Kwon et al., Be Selfish and Avoid Dilemmas:Fork After Withholding (FAW) Attacks on Bitcoin, Oct. 2017, ACM, pp. 1-15" (Year: 2017).*

"Gencer, A., On Scalability of Blockchain Technologies, Aug. 2017, pp. 1-33" (Year: 2017).*

"Greenspan, G., The Blockchain Immutability Myth, May 2017, Multichain, pp. 1-10" (Year: 2017).*

\* cited by examiner

META BLOCK CHAIN

BACKGROUND

The present disclosure relates in general to the field of computer systems, and more specifically, to management of shared digital ledgers in peer-to-peer networks.

Data structures have been developed to provide a decentralized, distributed database to record electronic transactions. Such data structures may be used to document transactions. Such data structures, or block chains, may be composed of a linked list of secured blocks. The blockchain data structure is well known, having been used as the basis for virtual, cryptographic currencies such as Bitcoin. Such structures may be used to record data at various times, such as for the confirmation and timestamp of files. Accordingly, individual blocks may describe such transactions as those involving currency, real property, energy, health care, and other industries.

BRIEF SUMMARY

According to one aspect of the present disclosure, a fork in a block chain data structure may be identified, the block chain data structure including a first set of blocks each describing a respective transaction. The fork includes a first branch beginning with a first block and a second branch beginning with a different second block. The first branch includes a first set of blocks comprising at least the first block, and the second branch includes a second set of blocks including at least the second block. A determination may be made, based on a consensus protocol, that the second branch is to be discarded. Accordingly, a meta block may be generated to identify and describe the second branch. The meta block is to be included in a meta block chain data structure, the meta block chain data structure separate from the block chain data structure and comprising meta blocks to record orphaned branches of the block chain data structure.

BRIEF DESCRIPTION OF THE DRAWINGS

Like reference numbers and designations in the various drawings indicate like elements.

DETAILED DESCRIPTION

Figure 1:
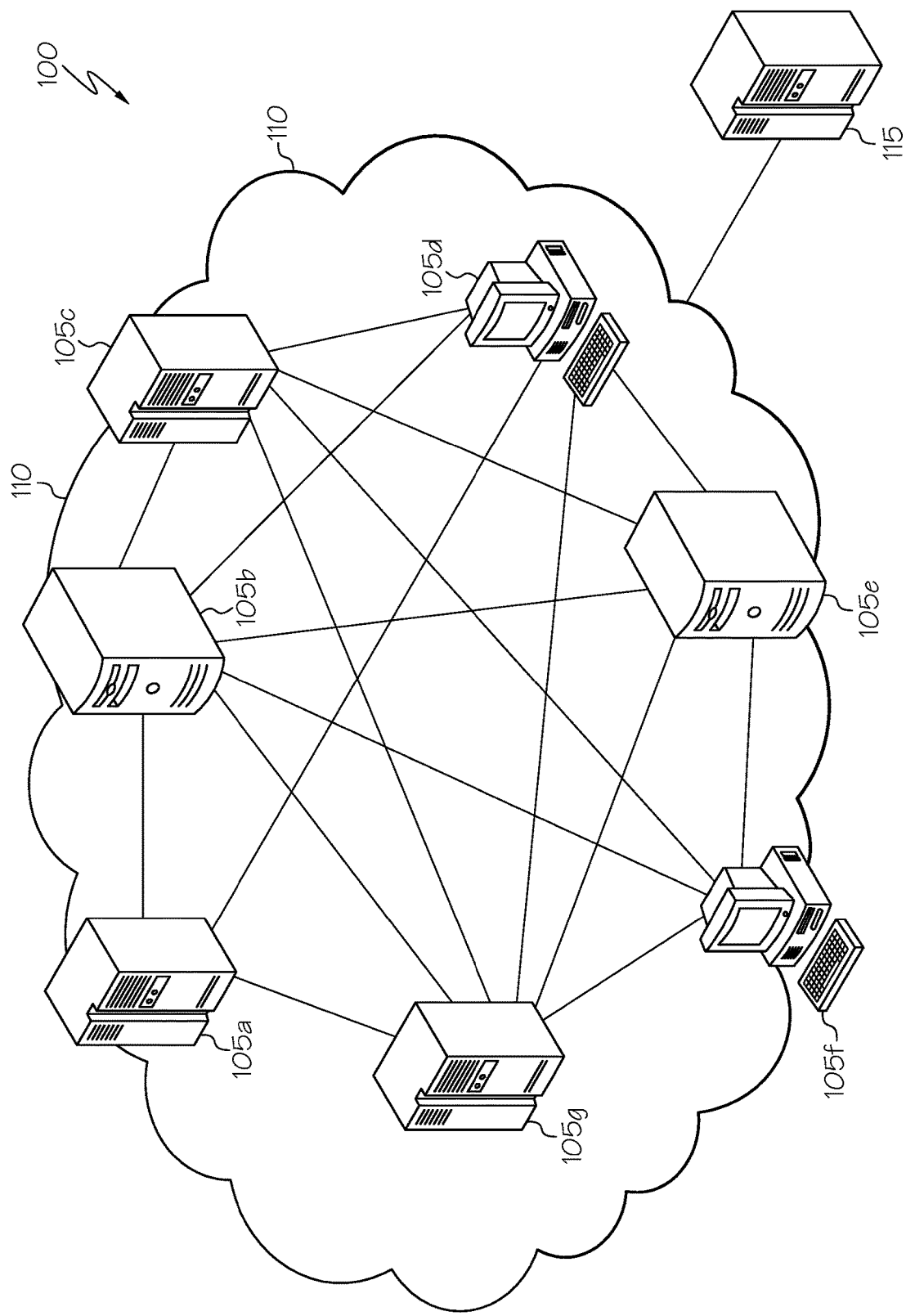
FIG. 1 illustrates a simplified schematic diagram of an example computing environment including a peer-to-peer block chain network.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100. In some embodiments, computing environment 100 may include functionality to enable the development and management of a distributed digital ledger composed of a string, or chain, of linked entries (or "blocks"), which, in some implementations may be hardened through security against modification to data stored within the individual entries. For instance, hashing and encryption may be utilized, according to a protocol defining the building of the block chain ledger, to ensure integrity of the block chains, preventing any one of the adopted blocks from being changed once it has been added to the block chain. A block chain, in some embodiments, may be implemented and hosted concurrently on multiple distinct systems (e.g., 105a-g) connected by one or more public and/or private networks (e.g., 110). In some instances, the computing systems 105a-g may participate in a peer-to-peer (P2P) network, with individual block chains built and shared concurrently by the multiple devices on the network. In some cases, the network of devices 105a-g implementing a block chain may be embodied in an open, public network (e.g., Blockchain), or in a private, closed network of systems to implement a private block chain ledger, among other example implementations.

A system (e.g., 100) implementing a block chain or collection of block chains, may include systems, or nodes, which store copies of the block chain, as well as at least some systems, or miners, which possess functionality to verify transactions and add new blocks to the block chain. In some cases, all miners may also serve as nodes, while not all nodes serve as miners. In one example, mining systems may perform software-based algorithms to derive complex hashes for use in verifying the legitimacy of the new block, as the hash is based on information included in the preceding block to which the new block is linked, among other example implementations. Systems participating in the maintenance and updating of a distributed block chain may also be programmed to do so according to rules, policies, and algorithms defined for the block chain. For instance, given the decentralization of an example block chain, it is possible that two (or more) mining systems may derive a solution to verify a two separate transactions and add a corresponding next block to a chain. However, these two new blocks would be different, with some of the computers within the P2P network adopting the first updated version of the block chain, and other computers adopting the second, alternative version of the block chain. The concurrent generation of different "next" blocks may thereby create a "fork" with two separate "branches" emerging from the fork. Algorithms may be defined for the block chain system to determine which of the two alternative forks to adopt as the globally accepted next block in the block chain. For instance, different versions emerging within the network may be each scored according to the algorithm, such that the network ultimately adopts the branch with the higher score (resulting in the losing branch being discarded, or orphaned, in favor of the adopted, winning branch), among other example algorithms used to manage the coherently develop and maintain the block chain.

In some implementations, one or more verification (or "verifier") systems, or other administrative systems (e.g., 115) may be provided in a system implementing a block chain to assist in mediating disputes, remedying the effects of hacks or other misuses of the block chain ledger, or perform other tasks. For instance, in a private block chain system, some centralized control of the block chain may be maintained utilizing an administrative system 115, which may be controlled by one or more human administrators, artificial intelligence, controllers driven by machine learning algorithms, or other example implementations. Public block chain implementations may also make use of an administrative system (e.g., 115), in some examples. For instance, a well-known vulnerability of the Blockchain system and bitcoin currency is the "51% attack." A 51% attack may involve a (even temporary) condition where a single entity, or multiple entities acting together, control more than 50% of a block chain network's mining computing power and act to invalidate or block valid transactions and replace them with invalid or substitute transactions. In this example, with control of the majority of the computing power, malicious actors may effectively monopolize the creation of new blocks in the chain, prevent other miners from completing blocks, thereby block others' transactions, send and reverse transactions (e.g., to double spend cryptographic currency tied to the block chain), and ensure that any forks adopt the branch favored by the malicious actors, among other negative effects. While many consider such an attack remote, an attack of this nature could be fatal to the trust instilled in the block chain ledger (e.g., which could cause a crash in the value of a cryptocurrency based on the block chain). Currently, for some popular block chain networks, no infrastructure exists to deal with the effects that would result from such an attack, among other example shortcomings.

Node and mining systems utilized to implement a block chain network may be implemented using potentially any type or formfactor of computing system, provided the system possesses the processing and memory capabilities, and corresponding logic, to perform tasks related to the distributed storage and maintenance of a block chain. For instance, server, rack, mainframe, or other high-performance computing systems may be used. In some implementations, personal computing devices may be tailored, enhanced, or otherwise provisioned with the capability to participate in a block chain network, among other examples. The networks 110 used to communicatively couple the components of a block chain network may likewise adopt any suitable computer communication network technology to facilitate communications between the participating systems (e.g., 105a-g). For example, one or a combination of local area networks, wide area networks, public networks, the Internet, cellular networks, Wi-Fi networks, short-range networks (e.g., Bluetooth or ZigBee), and/or any other wired or wireless communication medium may be utilized to for communications between the participating devices 105a-g, among other examples.

In general, elements of computing environment 100, such as "systems," "servers," "services," "hosts," "devices," "clients," "networks," "mainframes," "computers," and any components thereof (e.g., 105a-g, 110, 115, etc.), may be used interchangeably herein and refer to electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and/or proprietary operating systems.

Further, elements of computing environment 100 (e.g., 105a-g, 110, 115, etc.) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, one or more of the described components of computing environment 100, may be at least partially (or wholly) cloud-implemented, "fog"-implemented, web-based, or distributed for remotely hosting, serving, or otherwise managing data, software services, and applications that interface, coordinate with, depend on, or are used by other components of computing environment 100. In some instances, elements of computing environment 100 may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

As noted above, in at least some implementations of cryptocurrency blockchain systems, consensus algorithm may be utilized to score competing blocks concurrently created to cause a temporary fork in the block chain. Such consensus algorithms may, however, be vulnerable to revision by a miner or group of miners amassing more than 50% of total mining computing power. This event has already happened at least once when the GHash mining pool reached 51% of mining capacity with the Blockchain network undergirding bitcoin. Among other effects, such attacks can be launched to replace a significant portion of the block chain in order to double spend cryptocurrency, deny service, or perpetrate other malicious actions, which may have the additional effect of delegitimizing the broader block chain and any transactions recorded therein.

When malicious acts or even inadvertent errors cause an incorrect or undesirable branch selection in a soft fork, it may be desirable for an administrator (or the remaining members participating in the network) to intervene to undo the damage done by the error. However, in traditional block chain implementations, when a block or branch of blocks is orphaned during the branch selection it may, in some cases, be impossible to reliably retrieve and restore the orphaned blocks. Moreover, even if a copy of the orphaned blocks was saved, how does one guarantee to the trustworthiness of this copy, as such trust may form the basis for the integrity imputed to the block chain's transaction ledger. Accordingly, in some implementations, a metablock chain may be maintained in parallel with a block chain and serve as a verifiable (and, in some implementations, even publicly verifiable) ledger documenting all non-elected branches in soft forks of a block chain, thereby serving as a trustworthy backup of any orphaned or otherwise nonadopted fork branches. Through such a metablock chain, it may then be possible to track and segregate the nonadopted branches into a pool (separate from the consensus block chain) for investigation and potential reconciliation. For instance, using information within the metablock chain, maliciously or otherwise improperly added blocks may be replaced with the blocks of the branch that should have been adopted, or the block chain may be otherwise restored to an acceptable state representing a version of the block chain where the improperly added blocks are removed, among other example uses.

Figure 2:
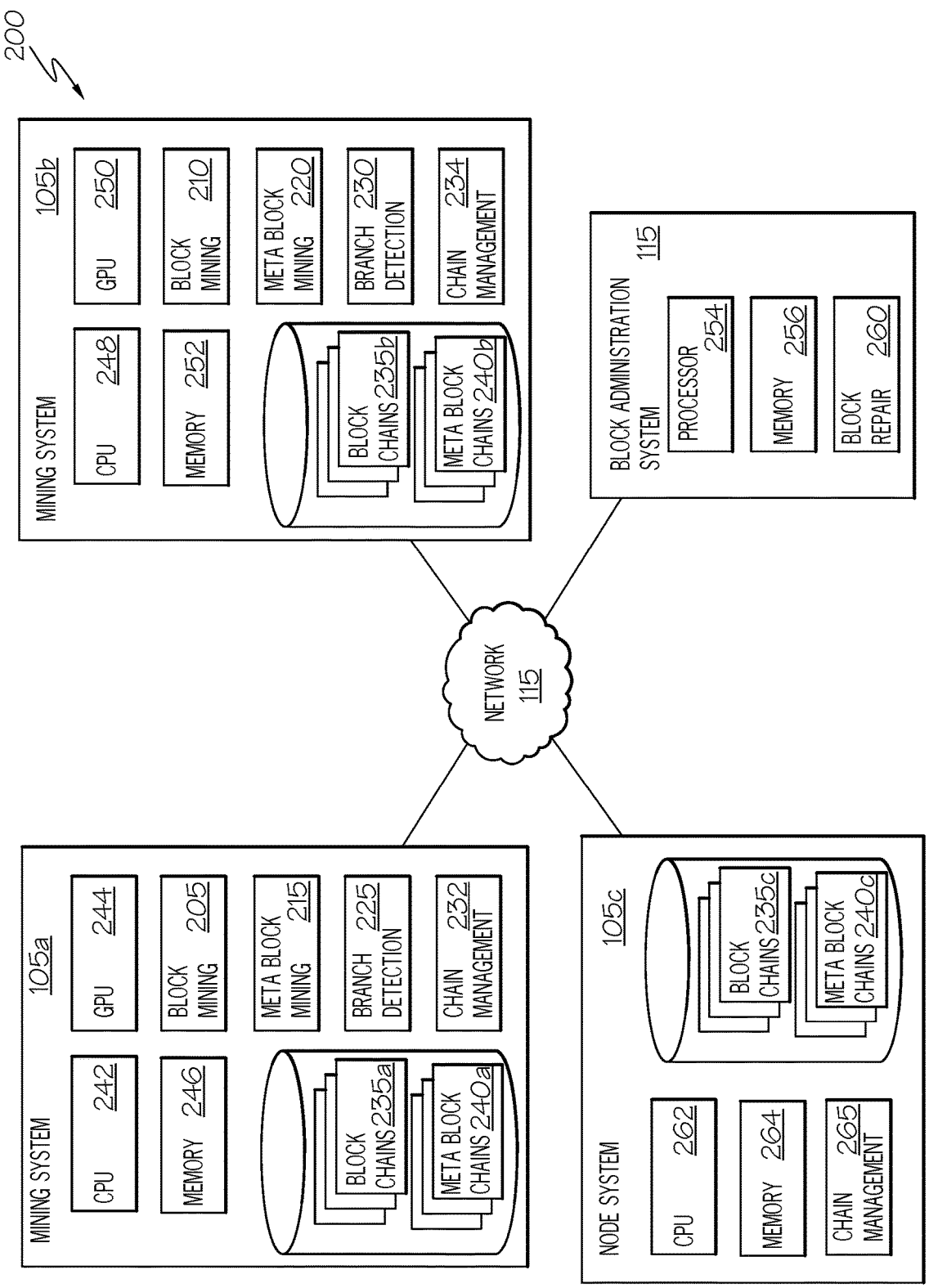
FIG. 2 illustrates a simplified block diagram of an example software system including mining systems and other nodes systems of a block chain network.

Turning to FIG. 2, a block diagram 200 is shown of an example system including computing devices equipped with hardware- and/or software-based functionality to implement a metablock chain. For instance, mining systems (e.g., 105a-b) and other node systems (e.g., 105c) may be provided, which are communicatively coupled through one or more wireless and/or wired network connections (e.g., in network(s) 115). Computing systems within the block chain network may each include each include one or more data processing apparatus (e.g., 242, 248, 262, and/or specialized processors, such as graphic processing units (GPUs) 244, 250)) and one more computer memory elements (e.g., 246, 252, 264), which may be included with other components (e.g., network communication modules) to implement hardware- and/or software-based logic to implement functionality of the block chain network. For instance, mining systems (e.g., 105a-b) may be computing systems equipped with functionality for mining, or deriving, a next block in a block chain (e.g., according to the particular cryptographic requirements defined for the block chain). These same systems (e.g., 105*a-b*) may locally store copies of block chains (e.g., 235*a-b*) to reflect a most current version of the respective block chain as understood by the system (e.g., 105) through communication with peer systems (e.g., 105*b-c*) in the block chain network. Other systems (e.g., 105*c*) may serve as non-mining nodes and may lack block mining logic for deriving new blocks in the chain. Non-mining nodes (e.g., 105*c*) may nonetheless include chain management logic 265 to determine when new nodes are to be added to their local copy of the block chain (e.g., 235*c*). Similar chain management logic (e.g., 232, 234) may be provided on systems (e.g., 105*a-b*) equipped with mining logic (e.g., 205, 210, 215, 220) to manage the block chain (e.g., 235*a-b*) versions maintained locally on the mining systems.

In some instances, a block chain implementation may define rules for the derivation of a next block in a chain. As two or more mining systems (e.g., 105*a-b*) may independently derive competing versions of the next block in a chain (e.g., within a, some implementations of block chains may define rules governing which of the competing blocks to adopt as the official next block in the chain. For instance, a consensus protocol, voting scheme, or other rules and protocols may be adopted (and enforced through the respective chain management logic (e.g., 232, 234, 265) implemented on the respective node systems (e.g., 105*a-c*)) to resolve forks, which may occur by virtue of competing next blocks being developed.

In some implementations, a block chain may adopt a Blockchain-based protocol as a consensus protocol enforced using chain management logic (e.g., 232, 234, 265). As noted above, separate blocks may be produced substantially concurrently by two different mining system (e.g., 105*a-b*) within the network, creating a temporary fork in the chain. A scoring scheme may be adopted for use by the individual network node systems (e.g., 105*a-c*) according to a defined algorithm. The scoring scheme may be used to score different versions of the same block chain that may be (at least temporarily) maintained concurrently between systems (e.g., 105*a-c*). The scoring scheme may be implemented such that the version of the block chain with the higher value is selected over all other competing versions for adoption as the official version of the block chain. As noted above, blocks occurring after the fork in unselected versions may be discarded as orphan blocks. For instance, chain management logic may keep the highest scoring version of a block chain ledger known to the system. Whenever the system receives a higher scoring version of the block chain from one of its peer systems, it may extend or overwrite its version of the block chain with the higher scoring version and share the improved block chain with its neighbors in the block chain network. In some examples, scoring may be based, at least partially, on the length of the chain, which may result in a longer version of the same chain (e.g., with one or more new blocks) outscoring a previously maintained version of the block chain and therefore replacing shorter versions of the chain. For instance, in block chains utilizing a proof-of-work algorithm, block chains with the most cumulative proof-of-work (reflected through the number of verified blocks in the chain) may effectively be the highest scoring and, thereby, considered the valid version of the chain within the network.

As noted above, instances may arise where it desirable to keep or have access to a record of orphaned blocks in a block chain, which have been discarded in accordance with the protocol defined for the block chain in resolving soft forks in the chain. Accordingly, in some examples, a separate block chain structure (e.g., 240*a*, 240*b*, 240*c*) may be developed and maintained that is constructed of "meta blocks," which describe, for their transactions, orphan blocks discarded in a corresponding block chain. For instance, when a block in a particular block chain (e.g., 235*a-c*) is discarded as a result of soft fork in the chain, a new block may be added to a corresponding meta block chain (e.g., 240*a-c*) to document the discarding of the block and describe the contents of the block. Accordingly, at least some systems (e.g., 105*a-b*) within a block chain network may be equipped with meta block mining logic (e.g., implemented in hardware circuitry and/or software or firmware) capable of generating meta blocks to be added to one or more meta block chains implemented within the network. Further, as meta block mining components (e.g., 215, 220) are to generate new meta blocks to describe the "transaction" of a branch of one or more blocks being discarded from corresponding block chains, some systems (e.g., 105*a-b*) may be equipped with fork detectors (e.g., 225, 230) to determine that competing versions of a block chain exist within the network such that a soft fork develops with different branches (of one or more blocks). The fork detectors (e.g., 225, 230) may additionally identify when one of the branches is to be discarded (e.g., as determined through chain management logic (e.g., 232, 234, 265)). Detecting a discarding event may trigger corresponding meta block mining logic 215 to attempt to generate, or mine, a corresponding new meta block to add to a meta block chain to describe the discarded branch in the corresponding block chain.

In some implementations, rules similar or different to the rules governing the creation and maintenance of block chain blocks may be defined for meta blocks. For instance, a proof-of-work scheme and consensus protocol governing the creation of blocks in the block chain (e.g., 235*a-c*) may also be utilized in creation of new meta blocks to be added to corresponding meta block chains (e.g., 240*a-c*). For instance, the solving of a crypto-puzzle may be required by mining systems to successfully generate a new meta block to be added to the meta block chain, among other example features. In other instances, distinct consensus protocol, hashing and cryptographic techniques and puzzles, proof-of-work schemes, and/or other features may be defined and govern creation of meta blocks, which are different from those used in the corresponding block chains, among other examples.

Additional systems may be provided in connection with an example block chain network. For instance, in the example of FIG. 2, a block administration system 115 may be provided, which may provide administration, supervision, and repair services to assist in correcting or mediating issues, which may arise within one or more block chains within the network. A block administration system 115 may include one or more data processing apparatus (e.g., 254), one or more memory elements (e.g., 256), and logic components implemented in hardware circuitry and/or software to perform administration tasks involving block chains generated and maintained in a P2P network. As an example, a block administration system 115 may include a block repair module 260, which may be configured to cause incorrect, compromised, or otherwise faulty blocks to be replaced across the network with one or more corrected blocks in a in a block chain, such as in response to a 51% attack or other event, which results in blocks being compromised in the block chain. In some instances, a block administration system may access a corresponding meta block chain to identify orphaned blocks as incorrectly discarded and cause these orphaned blocks to replace incorrectly adopted blocks in the chain, so as to remedy an event, which caused the orphaned blocks to be incorrectly discarded. In one example, a block administration system 115 may authenticate to and communicate with nodes in the P2P block chain system and may direct the node systems (e.g., 105*a-c*) to access a particular meta block chains (e.g., 240*a-c*) and identify one or more orphaned blocks, which were discarded from a corresponding block chain (e.g., 235*a-c*). The block administration system 115 may further instruct node systems (e.g., 105*a-c*) to replace one or more adopted blocks in the corresponding block chain with the discarded blocks recorded in the meta block chain. In other examples, the block administration system 115 may instruct node systems to append orphaned blocks described in a particular block of the meta block chain to the same or a different block chain than the block chain from which the orphaned blocks were discarded, among other examples.

Figure 3:
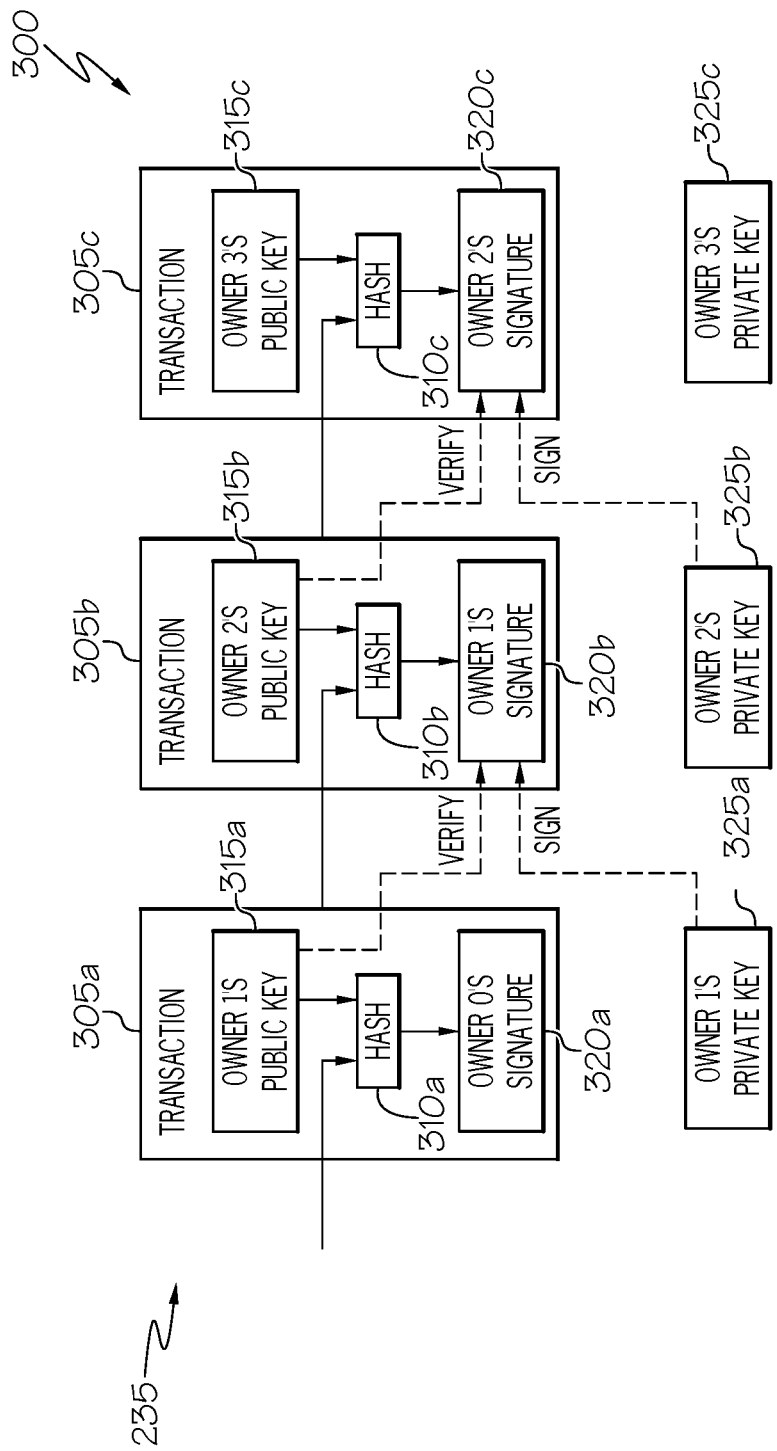
FIG. 3 illustrates a simplified block diagram representing an example block chain data structure.

Turning to FIG. 3, a simplified block diagram 300 is shown representing an example block chain. For example, the example block chain 235 shown in the example of FIG. 3 may be utilized to implement a cryptocurrency. As further illustrated in this example, block chains may be defined according to algorithms, which employ cryptography to harden the block records and establish the trustworthiness of each block in the chain (as well as its placement within the chain). For instance, in this example, multiple blocks (e.g., 305*a-c*) are provided and linked together in the chain as a linked list utilizing hash pointers (e.g., 310*a-c*). Each block 305*a-c* may include transaction data describing the transaction represented by the respective block. The blocks 305*a-c* may additionally include a hash, or hash pointer 310*a-c*, based on the data inside the preceding block in the chain. Further, in this example, the concept of ownership or possession may be modeled in the block chain 235 by utilizing a key pair associated with each successive owner (e.g., the owner of a unit of cryptocurrency, the steward or possessor of a piece of physical inventory tracked by the block chain, etc.). For instance, a block 305*a* may represent a first transaction passing ownership from Owner 0 to Owner 1. To generate the hash for the block 305*a*, the contents of the preceding block (not shown) may be hashed using a public key 315*a* associated with Owner 1. A signature 320*a* corresponding to the key pair of Owner 0 may also be included in the block 305*a*. Likewise, in a subsequent block 305*b* used to record the passing of ownership from Owner 1 to Owner 2, the public key of Owner 2 may be used to hash the contents of block 305*a*. The signature of Owner 1 may also be included within the block 305*b* by utilizing the private key 325*a* of Owner 1. The signature 320*b* may thereby serve to verify the authenticity of the transaction recorded in block 305*b* and validate the dependency (and sequence of ownership) of block 305*b* on block 305*a* (utilizing the corresponding public key 315*a* in block 305*a*). Each block in the block chain 235 may be similarly structured to define and verify the order and dependence of each block on the blocks preceding it, among other example features. Indeed, it should be appreciated that other block chain examples may utilize other, different techniques, algorithms, and formats that those illustrated in the particular simplified example of FIG. 3.

Figure 4A:
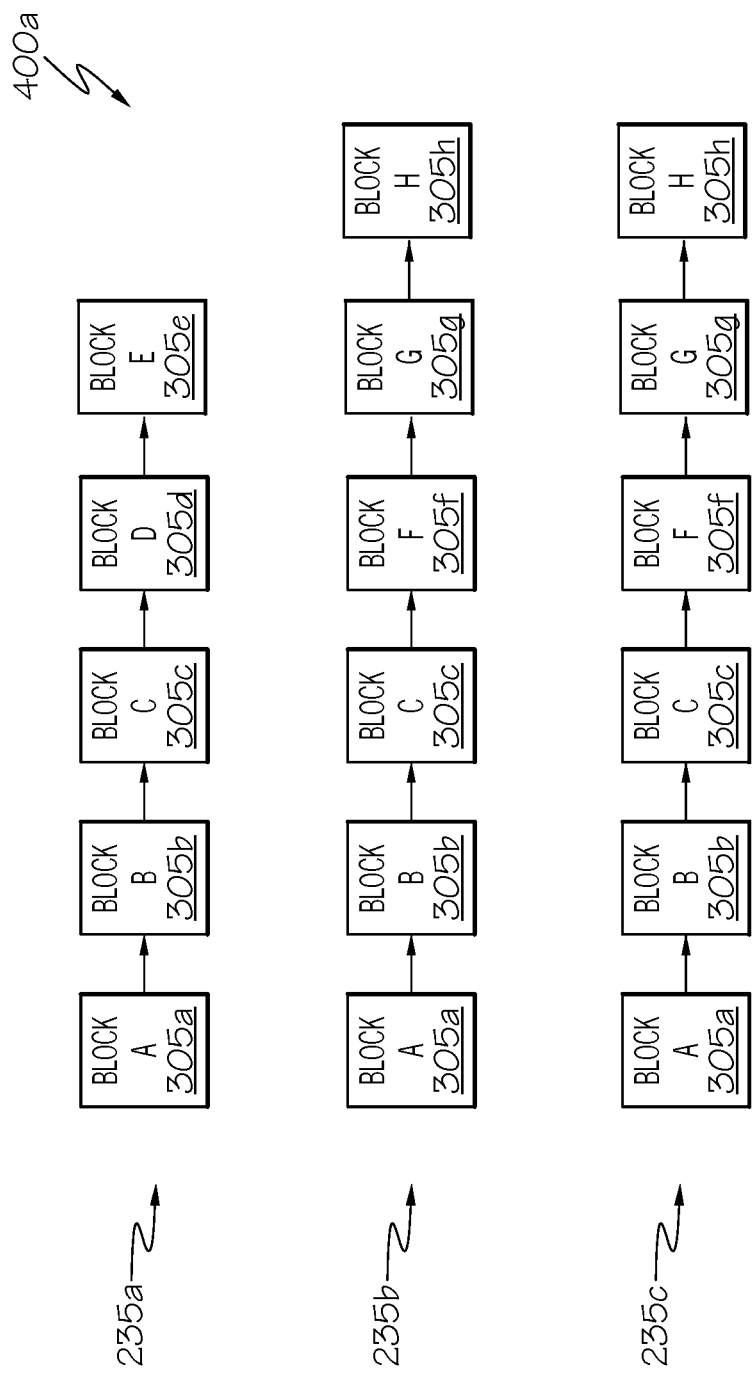
FIGS. 4A-4B are simplified block diagrams representing handling of a soft fork in a block chain.
Figure 4B:
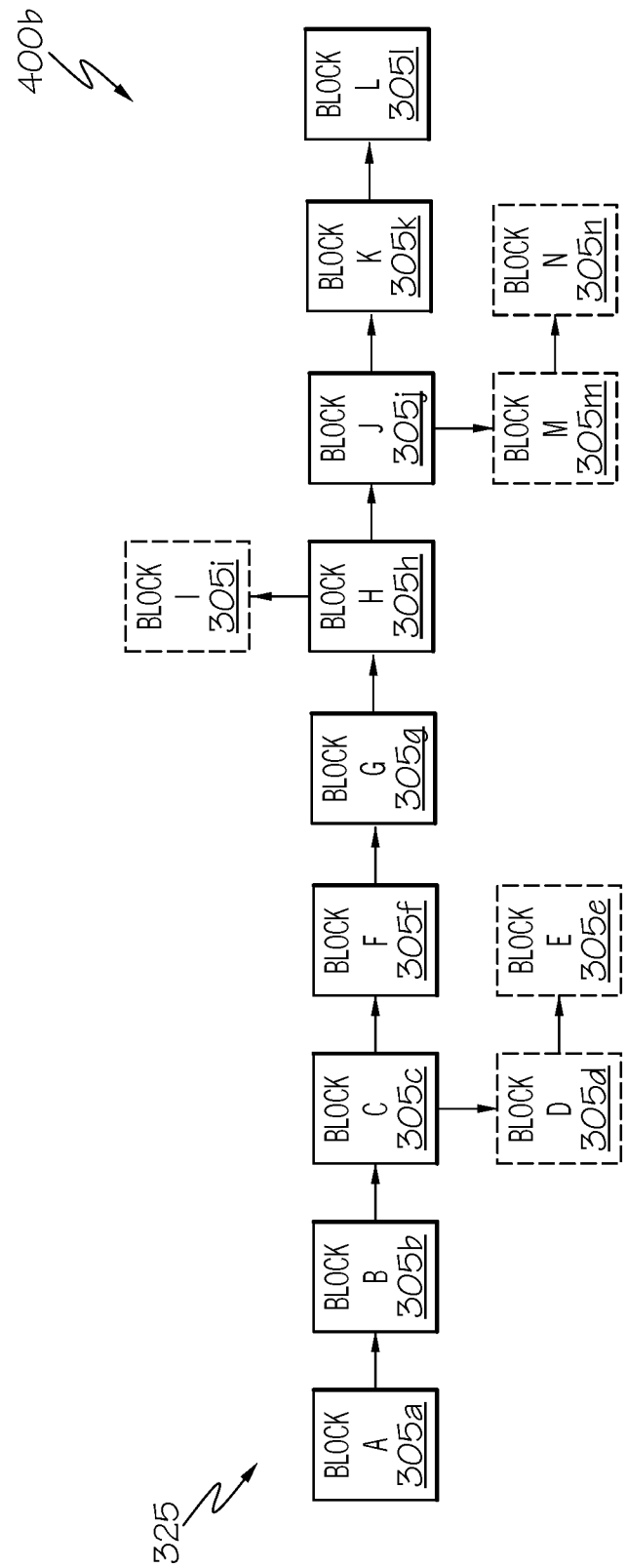

FIGS. 4A-4B are simplified block diagrams 400*a-b* illustrating the principle of soft forks, which may emerge in the development of an example block chain. For instance, as shown in FIG. 4A, separate versions (e.g., 235*a-c*) of the same block chain may be developed and maintained by the various node systems within the P2P network implementing the block chain. In this example, each of these versions possesses blocks A through C (e.g., 305*a-c*). However, in this example, two different mining systems discovered or generated a distinct next block to append to Block C, thereby causing a divergence in the versions (e.g., 305*a*, 305*b*) of the block chain. In this example, a first system derived Block D (305*d*) substantially concurrently with the generation of Block F (305*f*) by another second system in the network. At this moment, a soft fork in the block chain was created, with the first system building a branch from the Block C beginning with Block D 305*d*, and the second system building a branch from Block C beginning with Block F 305*f* (which may be different from Block D). Each system may advertise that it found the next block following Block C to its neighboring nodes. Accordingly, some of the node systems may regard Block D as the next block, while another set of nodes in the network regard Block F as the next block to follow Block C 305*c*. Indeed, these competing versions of the block chain may further be added to (e.g., with Block E (305*e*) being added to Block D 305*d* in version 235*a* and Blocks G and H (305*g-h*) being added to Block F in versions 235*b*, 235*c*, and so on). To resolve these competing versions of the block chain within the network, a consensus protocol may be defined, with rules governing, which competing version, or branch, of the block chain is to be adopted as the official version in the network. In some cases, the consensus protocol may be based, at least partially, on the relative length of the version, with longer versions being scored higher than shorter, competing versions, among other criteria and protocol examples.

Turning to FIG. 4B, a simplified diagram 400*b* is shown illustrating the history of an example block chain 325 in which multiple soft forks have emerged (e.g., forks from Blocks C, H, and J), forcing the nodes in the network to collectively select one of the competing branches (i.e., the different sets of blocks diverging from the soft fork) and discard the unselected branch(es) (e.g., according to a defined consensus protocol). For instance, with reference to the example illustrated in FIG. 4A) a branch consisting of Blocks F-H (e.g., in versions 235*b-c*) may be adopted in favor of a branch consisting of Blocks D and E (e.g., in version 235*a*). Accordingly, Blocks D and E may be discarded as orphan blocks 305*d-e* (represented in broken lines), while additional, subsequent blocks are appended to the adopted blocks 305*f-h*. Continuing with this example, another soft fork may develop with two competing branches from Block H 305*h*. In this example, the branch including lock I (305*i*) is discarded in favor of a competing branch including Block J 305*j*. Likewise, Blocks M and N (305*m-n*) may be discarded in favor of Blocks K and L (305*k-l*), and so on, as illustrated in the example of FIG. 4B.

As introduced above, a meta block chain may be utilized to record and memorialize the discarding of blocks in competing versions of a block chain data structure (e.g., 325). Turning to the example of FIG. 5A, an example meta block chain 240 may be developed in association with block chain 235. A portion of the example block chain 235 from FIG. 4B is shown. The example meta block chain 240 in this example corresponds to block chain 235 and includes meta blocks (e.g., 505*a-b*), which record details of the orphan blocks of block chain 235. For instance, meta block 505*a* records the discarding of Blocks D and E in connection with a soft fork at Block C 305*c*. In some implementations, the meta block 505*a* may include copies of the orphaned blocks (i.e., Blocks D and E). Other information may also be maintained, such as the time of the orphaned blocks' creation and/or discarding, the location of the soft fork (e.g., after Block C), an identification of the block chain to which the orphaned blocks belonged, among other example information.

In some implementations of a block chain, it may be relatively common for soft forks to occur. In such cases, it may be less desirable to record each and every discarded branch of blocks in a meta block of a meta block chain. Accordingly, in some implementations, rules may be defined to filter which orphan blocks are to be recorded in the meta block chain 240. For instance, in one example, meta block mining systems may only be triggered to generate a new meta block when a branch of more than one blocks is detected as being orphaned from a block chain 235. Additional or alternative rules may be applied in other examples to dictate the conditions for generating a new meta block in response to the discarding of a branch of one of or more blocks in a block chain. As examples, the type of transaction(s) described in the orphaned branch, the owner(s) involved in the transaction, the time of day, and other factors may be considered when determining whether a meta block is to be generated in response to the discarding of blocks in a block chain, and so on.

Figure 5A:
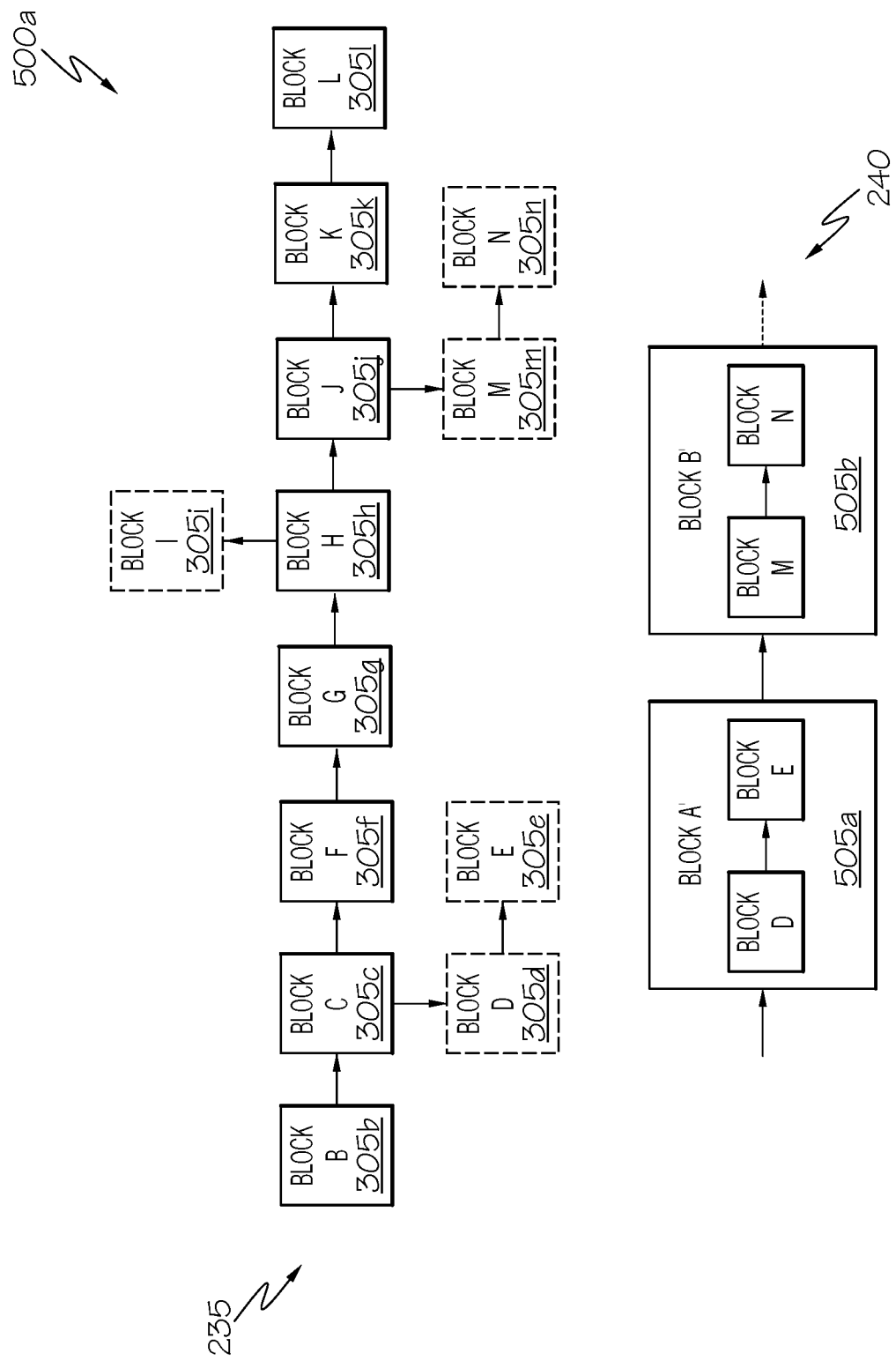
FIG. 5A is a simplified block diagram illustrating an example meta block chain data structure.

In the example of FIG. 5A, the block chain network implementing block chain 235 may include mining systems capable of detecting the discarding of blocks in connection with a consensus protocol's handling of a soft fork in the block chain 235. Further, in this particular example, a condition may be defined, which causes meta blocks to be generated when a branch of two or more blocks are discarded from a soft fork. Accordingly, as shown in FIG. 5A, a first meta block 505*a* is generated in response to and to document the discarding of a first branch consisting of Blocks D and E (305*d-e*). A second meta block 505*b* is generated to document the discarding of a later branch with Blocks M and N (305*m-n*). However, for a branch with only a single block (e.g., Block I 305*i*), the branch is allowed to be discarded without the creation of a corresponding meta block, among other examples.

Figure 5B:
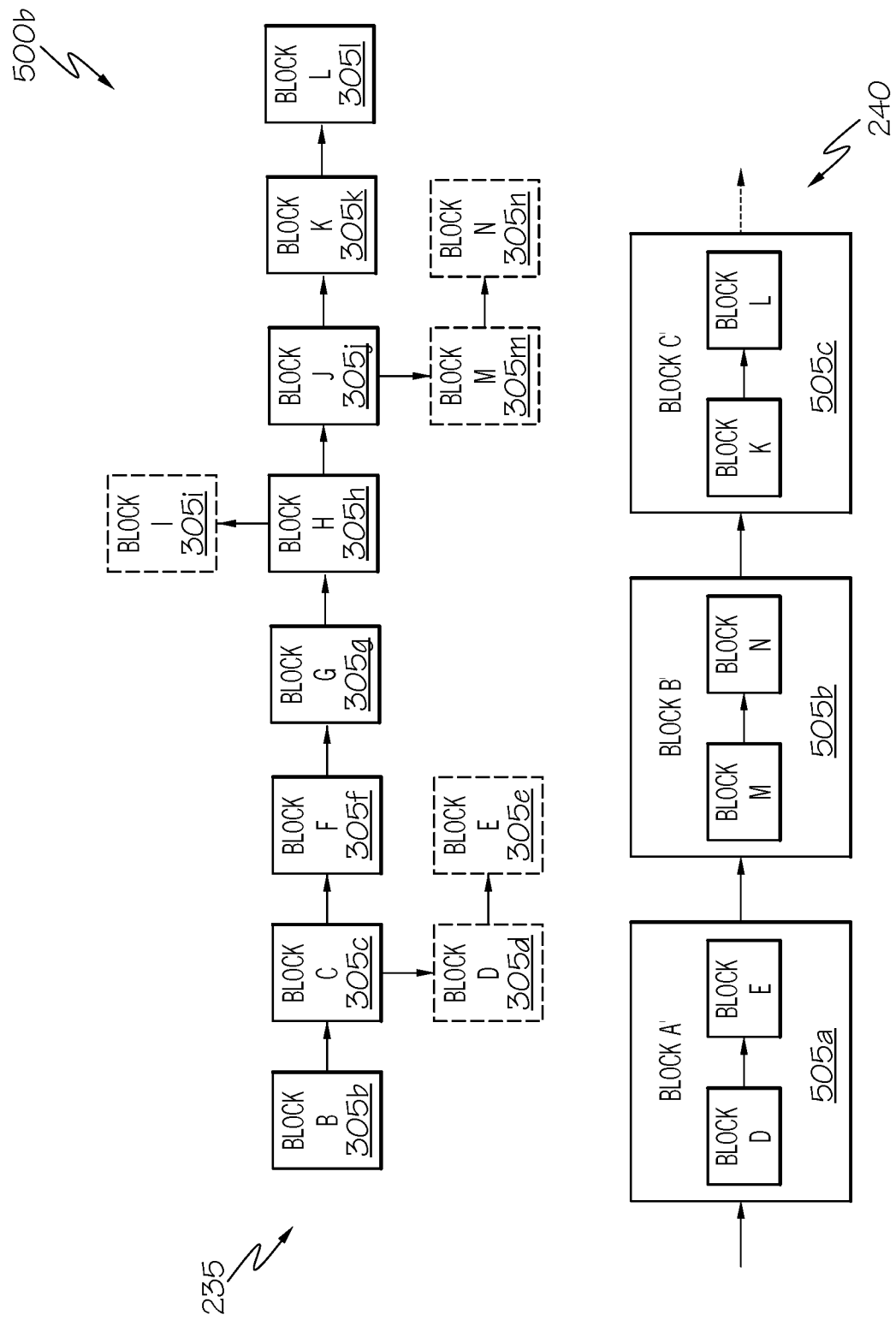
FIG. 5B is a simplified block diagram illustrating replacement of blocks in a block chain using an example meta block chain.

As noted above, the records within a meta block chain may be advantageously used to make corrections to a block chain or restore a block chain to an accurate state. For instance, turning to the diagram 500*b* of FIG. 5B, an administrator or administration system for a block chain system may conclude that a branch of blocks was incorrectly or fraudulently adopted over a competing branch of blocks. For instance, in this example, it is determined that a branch consisting of Blocks K and L (305*k-l*) was incorrectly adopted in favor of another branch consisting of Blocks M and N (305*m-n*). If it is determined that the branch of Blocks K and L (305*k-l*) should be replaced by the branch of Blocks M and N, the meta block (e.g., 505*b*) recording the discarding of Blocks M and N may be accessed, which describes the content and character of the discarded blocks. From this information, Blocks M and N may be recreated and restored. An administration system (and replacement protocol defined within the block chain network), may cause the restored Blocks M and N to replace Blocks K and L, causing Blocks K and L (305*k-l*) to be orphaned. As with the orphaning of other blocks in the block chain, replacing Blocks K and L with Blocks M and N causes a new meta block 505*c* to be generated to document the discarding of Blocks K and L in response to this replacement event. In this example, meta block 505*c* may describe the contents of Blocks K and L and may also include data identifying the nature of the orphaning of these blocks, namely that Blocks K and L were replaced by Blocks M and N (e.g., in accordance with administrator's replacement event), among other example information.

Figure 6:
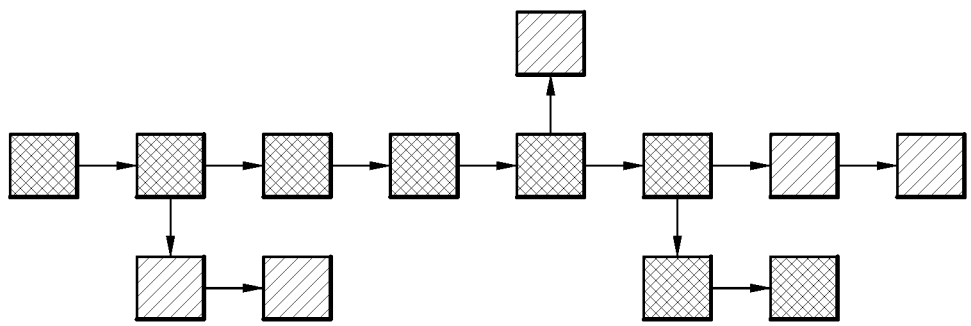
FIG. 6 is a simplified block diagram illustrating block chains and corresponding meta block chains.
Figure 6:
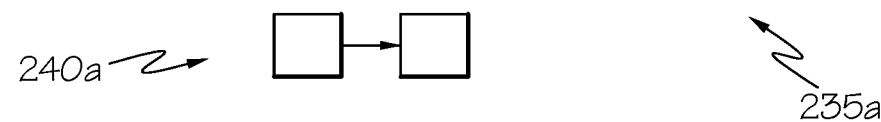
Figure 6:
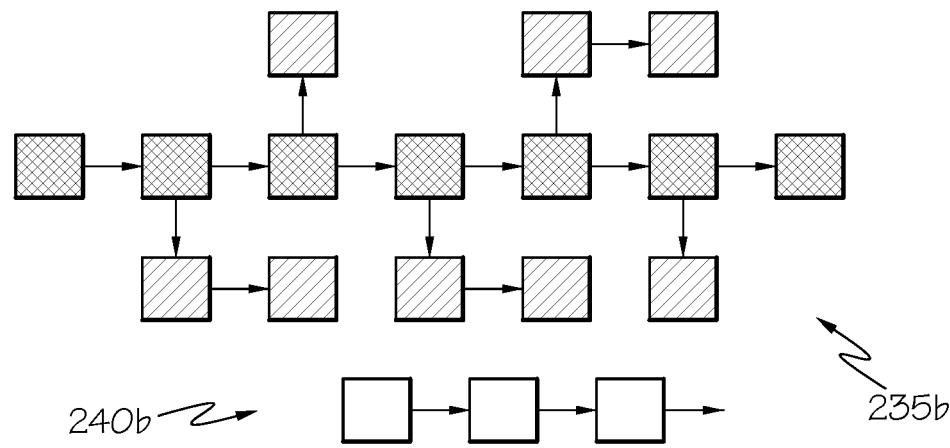
Figure 6:
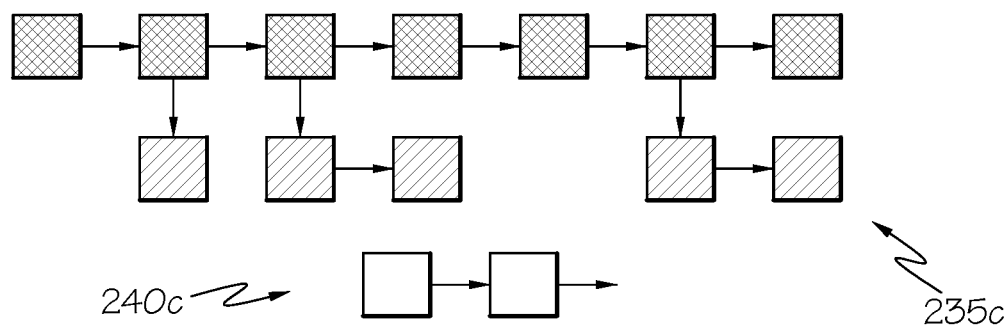

FIG. 6 is a simplified block diagram 600 illustrating that multiple block chains 235*a-c* and multiple metablock chains 240*a-c* may be created and maintained within a block chain network. In the example of FIG. 6, a respective meta block chain (e.g., 240*a-c*) may be created to document (at least some of the) orphaned blocks for a corresponding block chain (e.g., 235*a-c*). In some cases, meta block chains may be created to correlate, on a one-to-one basis with the block chains maintained in the system (such as in the illustration of FIG. 6). In other implementations, at least some meta block chains may correspond to and be used to document orphaned blocks for more than one block chains, among other example implementations.

Figure 7:
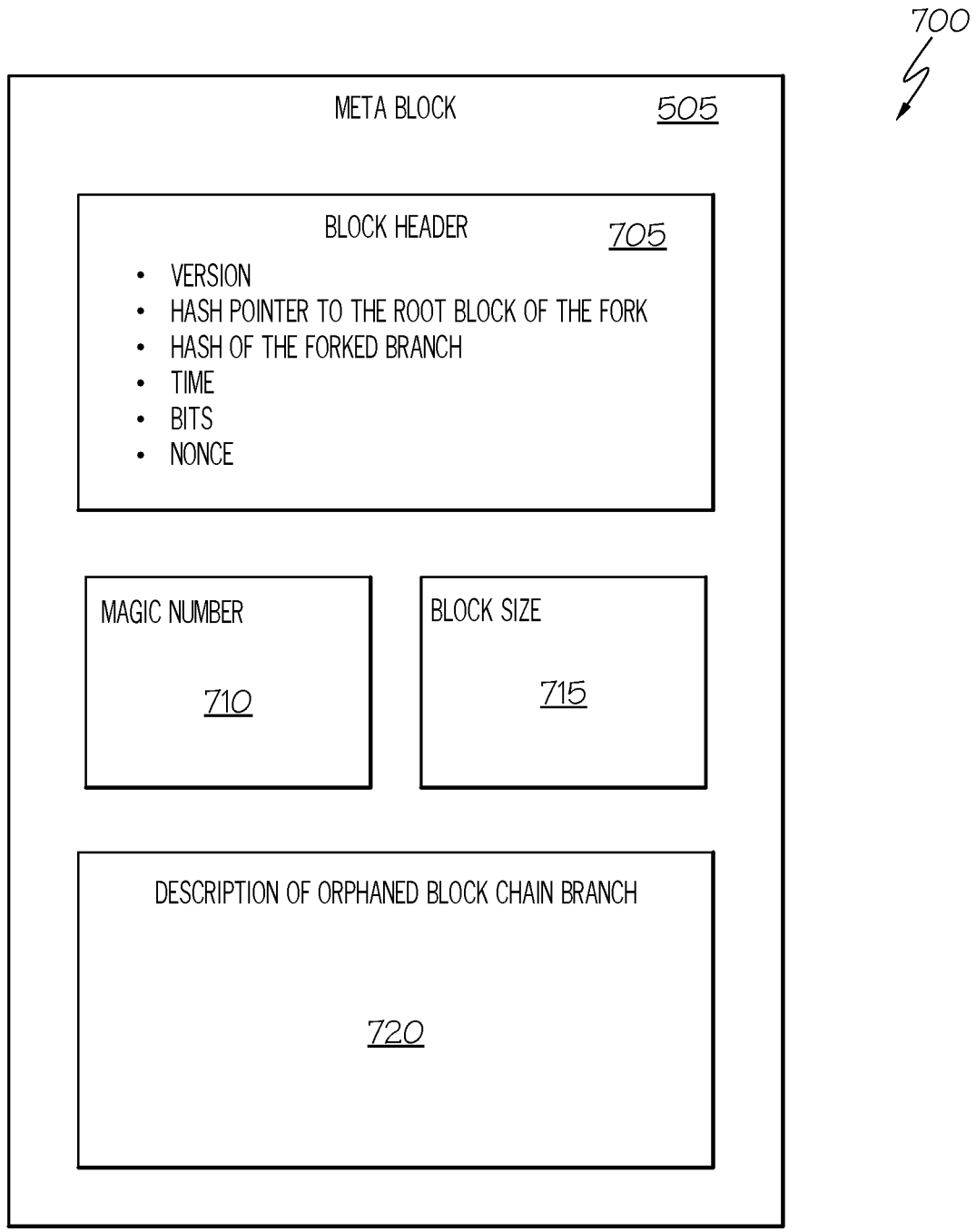
FIG. 7 is a diagram illustrating the example format of meta block for inclusion in a meta block chain.

FIG. 7 is a diagram 700 illustrating an example of a defined format for meta blocks (e.g., 505) to be provided in a meta block chain maintained by an example block chain network. For instance, a meta block 505 may include a block header 705, a magic number 710, a block size field 715, and data 720 describing the replacement of an orphaned block chain documented using the meta block. The block header 705, in this example, may include a version identifier (e.g., to document the version of a meta block chain protocol utilized in the creation of the meta block), a hash pointer value (pointing to the root of the fork (e.g., identifying the block in the block chain where the soft fork emerged) to identify the soft fork to which the orphaned blocks correspond), a hash of the forked branch (e.g., the orphaned branch), a time value to indicate the time of creation of the meta block 505, a bits field, and a nonce for the block. In some cases, some of the fields defined for the format of a meta block chain may be found in the defined format for the corresponding block chain block, while other fields may be unique to the meta block definition. It should be appreciated that the example format provided in the example of FIG. 7 is but one example format, and that multiple alternative formats may be adopted in other implementations without departing from the principles discussed herein.

Figure 8:
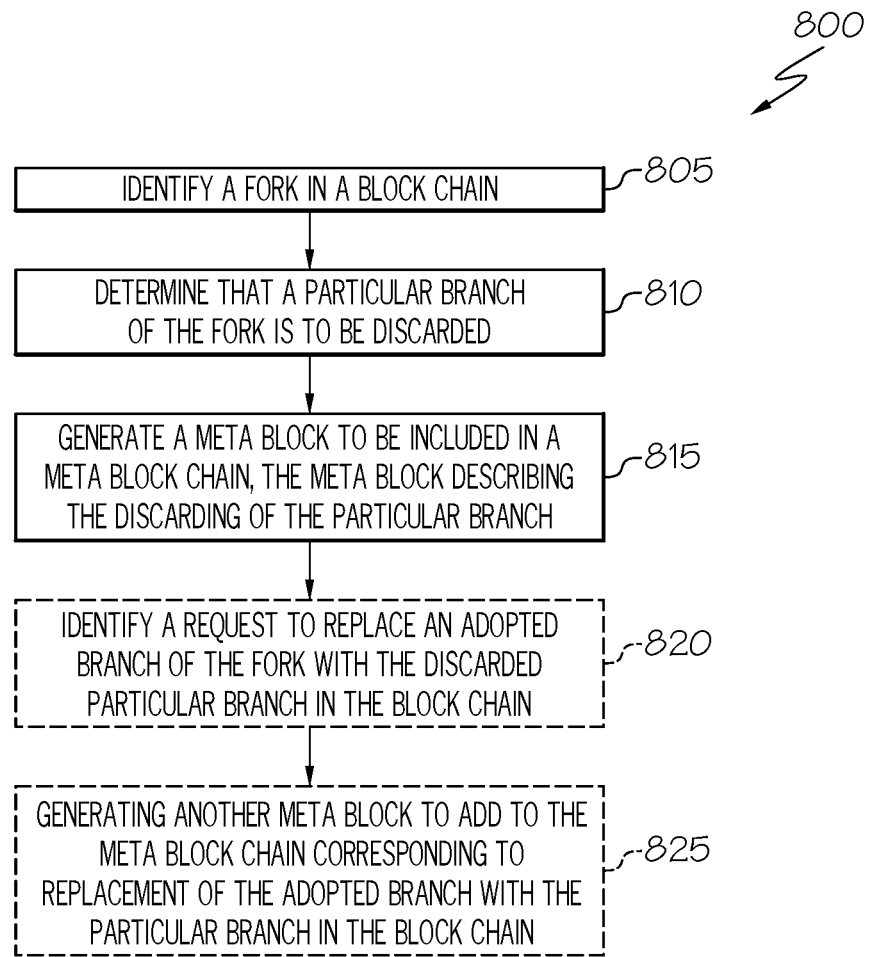
FIG. 8 is a flowchart illustrating an example technique for managing orphaned blocks in a block chain data structure using a meta block chain.

FIG. 8 is a flowchart 800 showing an example technique for managing orphaned blocks in a block chain data structure. A soft fork may be identified 805 in a particular block chain data structure based on multiple different versions of the particular block chain being developed as a result of two different branches of blocks being mined or otherwise created to append from the same root block. A fork may be identified 805 in the block chain, for instance, based on one or more of the node systems receiving an advertisement from another node of the competing version of the block chain. The nodes systems, individually and/or collectively may apply a scoring, voting, or other consensus protocol to determine which of the competing version of the block chain to keep, and which to discard. A particular branch of one or more blocks may be determined 810 to be discarded in order to bring all versions of the block chain maintained within the network into harmony. In response to determining that the particular branch is to be discarded, a corresponding meta block may be generated 815 to be added to a meta block chain (separate from the block chain), the meta block describing the discarding of the particular branch, including descriptions of each of the orphaned blocks included in the particular branch. The meta block and meta block chain may thereby serve as a ledger to record instances where branches were discarded within the block chain. The information in the meta block chain may be used, for instance, to restore the orphaned blocks if it is determined that the orphaned blocks were wrongfully discarded. For example, a request may be identified 820 to replace an adopted branch of the block chain (e.g., the branch selected in favor of the particular branch at the corresponding soft fork) with the discarded particular branch. Replacing one branch with another results in discarding of the replaced branch, which may trigger the generation 825 of another meta block to document the discarded branch and its composite blocks, among other example uses and implementations.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
   identifying a fork in a block chain data structure, wherein the block chain data structure comprises a first set of blocks each describing a respective transaction, the fork comprises a first branch beginning with a first block and a second branch beginning with a different second block, the first branch comprises a first set of blocks comprising at least the first block, and the second branch comprises a second set of blocks comprising at least the second block;
   determining, based on a consensus protocol, that the second branch is to be discarded; and
   generating a meta block identifying the second branch, wherein the meta block is to be included in a meta block chain data structure, and the meta block chain data structure is separate from the block chain data structure and comprises meta blocks to record orphan branches of the block chain data structure.

2. The method of claim 1, wherein the meta block comprises a particular meta block, the meta block chain data structure comprises a plurality of linked meta blocks, and the particular meta block comprises a hash pointer to a previous one of the plurality of linked meta blocks in the meta block chain.

3. The method of claim 1, wherein the block chain data structure comprises a particular one of a plurality of block chain data structures maintained in a system, the meta block chain data structure comprises particular one of a plurality of meta block chain data structures, and the particular meta block chain data structure corresponds to the particular block chain data structure.

4. The method of claim 1, further comprising determining a number of blocks in the second set of blocks, wherein the meta block is generated based on the number of blocks exceeding a particular threshold.

5. The method of claim 4, wherein a meta block is not to be generated and appended to the meta block chain data structure when the number of blocks in a discarded branch falls below the particular threshold.

6. The method of claim 4, wherein the particular threshold comprises two or more blocks.

7. The method of claim 4, wherein the meta block describes the second set of blocks.

8. The method of claim 1, further comprising replacing the first branch with the second branch in the block chain data structure based on an administrator message, wherein the administrator message is based on a determination that the first branch was improperly adopted in the block chain data structure.

9. The method of claim 8, wherein the meta block comprises a first meta block, replacing the first branch with the second branch comprises discarding the first branch, and the method further comprises:
   generating a second meta block to describe the first branch based on replacing the first branch with the second branch; and
   appending the second meta block to the meta block chain data structure.

10. The method of claim 9, wherein the second meta block references the fork to identify that the second branch described in the first meta block replaced blocks of the first branch described in the second meta block.

11. The method of claim 1, wherein the meta block is generated according to a defined meta block format, and the meta block format defines a magic number field, a block size field, a block header field, and a field to describe the second set of blocks.

12. The method of claim 11, wherein the block header field comprises a header according to the meta block format, and the header comprises a hash pointer field comprising a hash pointer to point to a root of the fork and a hash field comprising a hash of the second branch.

13. The method of claim 12, wherein the header further comprises a version field, a time field, a bits field, and a nonce field.

14. The method of claim 1, wherein the number of blocks in the first set of blocks is larger than the number of blocks in the second set of blocks.

15. The method of claim 1, wherein the meta block chain is to be simultaneously maintained by a plurality of computing devices in a peer-to-peer network.

16. The method of claim 15, wherein the meta block chain comprises an electronic public ledger.

17. A non-transitory computer readable medium having program instructions stored therein, wherein the program instructions are executable by a computer system to perform operations comprising:
   identifying a fork in a block chain data structure maintained by a plurality of computing devices in a peer-to-peer network, wherein the block chain data structure comprises a plurality of blocks each describing a respective transaction, the fork comprises a first branch comprising a first set of blocks and a second branch comprising a second set of blocks;
   determining, based on a consensus protocol governing maintenance of the block chain data structure in the peer-to-peer network, that the second branch is to be discarded in favor of the first branch, wherein the first branch is to be adopted in the block chain data structure; and
   generating a meta block to be included in a meta block chain data structure, wherein the meta block identifies the second branch, and the meta block chain data structure comprises meta blocks to record discarded branches of the block chain data structure.

18. A system comprising:
a data processing apparatus;
a memory; and
a meta block mining engine, executable by the data processing apparatus to:
   identify a fork in a block chain data structure maintained by a plurality of computing devices in a peer-to-peer network, wherein the block chain data structure comprises a plurality of blocks each describing a respective transaction, the fork comprises a first branch comprising a first set of blocks and a second branch comprising a second set of blocks;
   determine, based on a consensus protocol governing maintenance of the block chain data structure in the peer-to-peer network, that the second branch is to be discarded in favor of the first branch, wherein the first branch is to be adopted in the block chain data structure; and
   generate a meta block to be included in a meta block chain data structure, wherein the meta block identifies the second branch, and the meta block chain data structure comprises meta blocks to record discarded branches of the block chain data structure.

19. The system of claim 18, further comprising a plurality of devices, wherein each of the plurality of devices comprises a respective meta block mining engine, and each of the plurality of devices maintains an instance of the meta block chain data structure.

20. The system of claim 18, further comprising an block chain structure manager executable to replace the first branch with the second branch in the block chain data structure based on an administrator message, wherein the administrator message is based on a determination that the first branch was improperly adopted in the block chain data structure,
   wherein the meta block comprises a first meta block, and the meta block mining engine is further to:
      generate a second meta block to describe the first branch based on replacing the first branch with the second branch; and
      append the second meta block to the meta block chain data structure.

* * * * *